United States Patent Office 3,510,358
Patented May 5, 1970

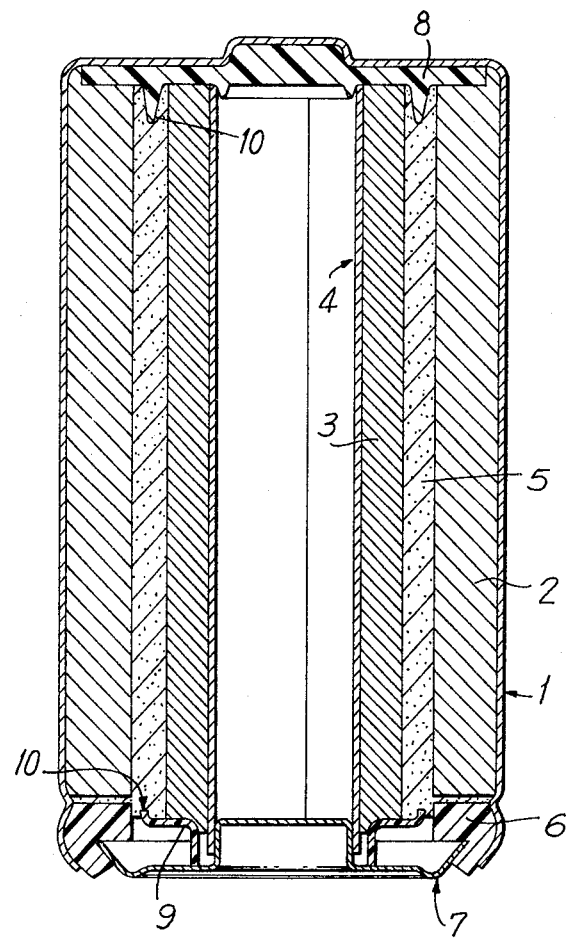

3,510,358
PRIMARY ALKALINE CELL
Faat Khatovich Nabiullin, Mytischinskaya ul. 14-a, kv. 90; Ivan Ivanovich Koval, N-Peschanaya ul. 23/7, kv. 369; Zoya Mikhailovna Buzova, Suschevsky val. 23, kv. 116; and Efim Mikhailovich Gertsik, Mytischinskaya ul. 14-a, kv. 98, all of Moscow, U.S.S.R.; Boris Vasilievich Marfin, Oblast ul., Sovetskaya 16, kv. 6, Balashikha I, Moskovskaya, U.S.S.R.; and Vyacheslav Anatolievich Rabinovich Razumovskaya naberezhnaya 14, kv. 34, Moscow, U.S.S.R.
Filed Nov. 2, 1967, Ser. No. 680,149
Int. Cl. H01m 21/00, 13/06
U.S. Cl. 136—107                                    1 Claim

ABSTRACT OF THE DISCLOSURE

A primary alkaline cell comprises a tubular negative electrode with internal current collector disposed within a tubular positive electrode with external current collector, a partition being disposed between the electrodes and functioning as an ion-conducting diaphragm. Washers of electrical insulating material are at the ends of the electrodes and the washers each have at least one annular rib embedded in the ends of the partition to reliably separate the electrodes and prevent short circuit through the diaphragm.

---

The present invention relates to primary alkaline cells.

Widely known in the art are primary alkaline $MnO_2$-Zn cells in which the electrodes, viz., the positive electrode with current collector and the pasted zinc negative electrode with current collector (in the form of a tube whose cavity serves as a gas chamber), are disposed coaxially and separated by an ion-conducting diaphragm comprised of a gelled electrolyte.

The construction of these prior art primary alkaline cells has the disadvantage that it does not eliminate short-circuiting between the electrode butt ends due to both spalling of positive electrode material particles and spreading of the negative electrode material in the course of primary cell manufacture.

It is an object of this invention to eliminate the aforementioned disadvantage.

This and other objects are accomplished, according to the present invention, by the provision in the primary galvanic cell of washers made from an electric insulating material and disposed at the butt ends of the cell electrodes, each washer being furnished with a rib which protrudes into the ion-conducting diaphragm throughout its entire periphery.

The present invention is illustrated by the description of an exemplary embodiment thereof and the accompanying drawing shows, in the sole figure thereof, a sectional view of the cylindrical primary alkaline cell according to the invention.

The cell is contained in a metal case 1, which accommodates positive electrode 2 comprised of manganese dioxide, carbonaceous materials and electrolyte, metal case 1 serving simultaneously as the current collector of positive electrode 2. Negative electrode 3, which is made of pasted zinc and pressed onto tubular current collector 4 comprised of a metal sheet bent in the form of a helix, is contained within the cavity of positive electrode 2 and separated therefrom by ion-conducting diaphragm 5 which consists of thickened electrolyte. In the bottom part of metal case 1 provision is made for a ridge against which there abut sealing ring 6 and metal bottom 7. To seal the cell, recourse is had to rolling in the edges of case 1. In order to provide a reliable electric contact, the protrusion of bottom 7 enters the inner cavity of current collector 4. Disposed at the butt ends of electrodes 2 and 3 are washers 8 and 9 made of an insulating material, i.e., polyethylene. In each washer provision is made for an annular rib 10 which protrudes into ion-conducting diaphragm 5 along the entire periphery of the diaphragm butt end. Washer 8 is mounted in case 1 prior to the fabrication of electrodes 2 and 3, whereas washer 9 is inserted after negative electrode 3 and diaphragm 5 have been fabricated. Ribs 10 are instrumental in reliably separating positive and negative electrodes 2 and 3 from each other and preventing short circuits due to the presence of electrode material particles which happen to be contained within the diaphragm.

We claim:

1. A primary alkaline cell which comprises a tubular positive electrode; a current collector of said positive electrode made in the form of a tube and adjoining the external surface of said electrode; a hollow negative electrode made of pasted zinc and disposed coaxially within said positive electrode; a partition disposed between said positive and said negative electrodes, said partition functioning as an ion-conducting diaphragm; a current collector of said negative electrode disposed therewithin and made in the form of a tube whose inner space serves as a gas chamber; washers made of an electric insulating material at the ends of said electrodes, each of said washers including an annular rib protruding into said ion-conducting diaphragm along the entire periphery of the end surface thereof and protecting said electrodes from short-circuiting.

References Cited

UNITED STATES PATENTS

| | | |
|---|---|---|
| 2,993,947 | 7/1961 | Leger. |
| 3,069,485 | 12/1962 | Winger et al. |

FOREIGN PATENTS

| | | |
|---|---|---|
| 157,385 | 10/1963 | U.S.S.R. |
| 179,806 | 4/1966 | U.S.S.R. |

WINSTON A. DOUGLAS, Primary Examiner

A. SKAPARS, Assistant Examiner

U.S. Cl. X.R.
136—128